US012609246B2

(12) United States Patent
Chen et al.

(10) Patent No.: US 12,609,246 B2
(45) Date of Patent: Apr. 21, 2026

(54) CAPACITOR DEVICE AND METHOD FOR MANUFACTURING THE SAME

(71) Applicant: AP MEMORY TECHNOLOGY CORPORATION, Hsinchu County (TW)

(72) Inventors: Wen-Liang Chen, Hsinchu County (TW); Yen-Jun Li, Hsinchu (TW)

(73) Assignee: AP MEMORY TECHNOLOGY CORPORATION, Hsinchu County (TW)

( * ) Notice: Subject to any disclaimer, the term of this patent is extended or adjusted under 35 U.S.C. 154(b) by 279 days.

(21) Appl. No.: 18/363,623

(22) Filed: Aug. 1, 2023

(65) Prior Publication Data

US 2025/0046523 A1     Feb. 6, 2025

(51) Int. Cl.
| | |
|---|---|
| *H01G 4/33* | (2006.01) |
| *H01G 4/252* | (2006.01) |
| *H01G 4/30* | (2006.01) |
| *H01G 4/38* | (2006.01) |

(52) U.S. Cl.
CPC ............. *H01G 4/252* (2013.01); *H01G 4/306* (2013.01); *H01G 4/33* (2013.01); *H01G 4/385* (2013.01)

(58) Field of Classification Search
CPC .......... H01G 4/252; H01G 4/306; H01G 4/33; H01G 4/385
See application file for complete search history.

(56) References Cited

U.S. PATENT DOCUMENTS

| | | | | |
|---|---|---|---|---|
| 7,112,507 | B2 * | 9/2006 | Kim ..................... | H01L 23/5223 |
| | | | | 257/E21.011 |
| 7,838,381 | B2 * | 11/2010 | Blalock .................. | H10D 1/716 |
| | | | | 438/386 |
| 2005/0112836 | A1 * | 5/2005 | Kim .................... | H01L 23/5223 |
| | | | | 257/306 |
| 2007/0040205 | A1 * | 2/2007 | Blalock .................. | H10D 1/716 |
| | | | | 257/306 |
| 2016/0351656 | A1 * | 12/2016 | Che ......................... | H10D 1/042 |
| 2022/0028825 | A1 * | 1/2022 | Jeng .................... | H01L 23/5385 |
| 2022/0045162 | A1 * | 2/2022 | Chen .................... | H10D 1/042 |
| 2022/0238430 | A1 * | 7/2022 | Chen .................... | H10D 1/716 |
| 2024/0395695 | A1 * | 11/2024 | Welsh ................. | H01L 23/5223 |
| 2025/0046523 | A1 * | 2/2025 | Chen ..................... | H01G 4/252 |

* cited by examiner

*Primary Examiner* — Dion R. Ferguson
(74) *Attorney, Agent, or Firm* — WPAT, P.C.; Anthony King

(57) ABSTRACT

A capacitor device is provided. The capacitor device includes a capacitor structure, a conductive line, an inter-layer dielectric (ILD) and a first via conductor. The capacitor structure includes a lower electrode and an upper electrode. The conductive line is leveled with the lower electrode and electrically isolated from the lower electrode. The ILD is disposed over the capacitor structure and the conductive line. The first via conductor is adjacent to the capacitor structure and electrically coupled to the conductive line. A method for manufacturing a capacitor die is also provided.

20 Claims, 14 Drawing Sheets

CAPACITOR DEVICE AND METHOD FOR MANUFACTURING THE SAME

FIELD

The present disclosure relates to a capacitor device and a method for manufacturing a plurality thereof. In particular, the disclosed capacitor device includes a seal ring structure that laterally surrounds a capacitor structure.

BACKGROUND

Decoupling capacitors, which may be referred to as bypass capacitors, may serve as an energy reservoir to circuits integrated therewith. In some applications, the decoupling capacitor is implemented as an integrated passive device (IPD). The IPD capacitors are widely used due to features including high/dense capacitance value and low equivalent series resistance (ESR) and equivalent series inductance (ESL). IPD technology is a system in package (SiP) solution where high-quality passive devices can be fabricated on a chip and then connected to a main die by wire bonding or solder mounting. The IPD capacitors fabricated on the chip may be singulated to obtain a plurality of IPD capacitor dies, prior to connecting with the main die. However, the IPD capacitor may suffer damage, such as die chipping, die edge cracking, or defect intrusion, during the singulation operation, which may degrade the IPD capacitor's reliability. Therefore, alternative approaches to manufacturing the capacitor devices are required to enhance the reliability.

BRIEF DESCRIPTION OF THE DRAWINGS

Aspects of the present disclosure are best understood from the following detailed description when read with the accompanying figures. It should be noted that, in accordance with the standard practice in the industry, various structures are not drawn to scale. In fact, the dimensions of the various structures may be arbitrarily increased or reduced for clarity of discussion.

DETAILED DESCRIPTION

Figure 1A:
FIG. 1A illustrates a cross-sectional view of a capacitor device according to some embodiments of the present disclosure.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper." "on" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, although terms such as "first," "second" and "third" describe various elements, components, regions, layers and/or sections, these elements, components, regions, layers and/or sections should not be limited by these terms. These terms may be only used to distinguish one element, component, region, layer or section from another. The terms such as "first," "second" and "third" when used herein do not imply a sequence or order unless clearly indicated by the context.

Figure 1B:
FIG. 1B illustrates a cross-sectional view of a capacitor device according to some embodiments of the present disclosure.
Figure 2:
FIG. 2 illustrates a top view of a capacitor device according to some embodiments of the present disclosure in a state where no metal line is formed.

FIG. 1A illustrates a cross-sectional view of a capacitor device taken along line A-A of FIG. 2. FIG. 1B illustrates a cross-sectional view of a capacitor device taken along line B-B of FIG. 2. FIGS. 1A to 1B may be a fragmentary diagrammatic view of part or all of the capacitor device 100. The capacitor device 100 may be an integrated capacitor device or an integrated capacitor. FIGS. 1A to 1B has been simplified for the sake of clarity to better present the inventive concepts of the present disclosure. Additional features may be added to the capacitor device 100, and some of the features described below may be replaced, modified, or eliminated in other embodiments of the capacitor device 100. As shown in FIG. 1A, the capacitor device 100 includes a capacitor structure 110, an interlayer dielectric (ILD) 130 disposed over the capacitor structure 110, and a via conductor 140 adjacent to the capacitor structure 110. The capacitor device 100 has a lower surface 102 and an upper surface 104. In some embodiments, the capacitor device 100 includes an oxide film (not shown) exposed on the lower surface 102. The capacitor structure 110 may be formed on the oxide film over a semiconductor substrate (not shown). In some embodiments, the oxide film is also referred to as a silicon oxide film.

The capacitor structure 110 includes a first electrode including a lower metal plate 112, a second electrode including an upper metal plate 114, and an insulating film 126 between the first and second electrodes. In the example of the present specification, the first electrode including the lower metal plate 112 is also referred to as a lower electrode, and the second electrode including the upper metal plate 114 is also referred to as an upper electrode. The lower electrode including the lower metal plate 112 is electrically connected to at least one first conductive terminal 182 exposed on the upper surface 104 of the capacitor device 100. The upper electrode including the upper metal plate 114 is electrically connected to at least one second conductive terminal 184 exposed on the upper surface 104 of the capacitor device 100. The capacitor device 100 may include a plurality of first conductive terminals 182 and a plurality of second conductive terminals 184.

The lower electrode, the upper electrode, and the insulating film 126 form the capacitor structure 110. Since each of the lower electrode and the upper electrode includes at least one metal film (e.g., the lower metal plate 112 or the upper metal plate 114), the capacitor structure 110 is formed as an MIM (metal-insulator-metal) capacitor. The capacitor structure 110 is formed as a crown type stack capacitor, as shown in FIG. 1A.

Each of the lower electrode and the upper electrode includes a plurality of stacked conductor films. The lower electrode includes the lower metal plate 112 (also referred to as a metal film) and a metal film 122 as conductor films. The lower metal plate 112 and the metal film 122 are electrically connected to each other and function as an integral lower electrode. The metal film 122 may function as a barrier metal. The upper electrode includes a metal film 124, a doped silicon 128 and the upper metal plate 114 (also referred to as a metal film) as conductor films. The doped silicon 128 may fill the hollow space of the crown type stack capacitor with good coverage and improves a mechanical strength of the crown type stack capacitor. The conductor film 124, the doped silicon 128, and the upper metal plate 114 are electrically connected to each other and function as an integral upper electrode. The capacitor structure 110 may further includes one or more nitride films 127 between the insulating films 126. Alternatively, the capacitor structure 110 may further includes one or more nitride films (not shown) formed over a top surface of the lower metal plate 112.

The lower metal plate 112, the metal film 122, the metal film 124 and the upper metal plate 114 may be made of conductive materials, such as titanium (Ti) or Ti—TiN. Alternatively, the metal films 122 and 124 are made of Ti—TiN, and the lower metal plate 112 and the upper metal plate 114 are made of tungsten (W). The doped silicon 128 may be made of a boron-doped silicon germanium film. The insulating film 126 is made of, for example, a high-k dielectric material. The insulating film 126 includes, as a high-k dielectric material, for example, one or more of $Ta_2O_5$, $Al_2O_3$, $HfO_2$, $ZrO_2$ and $TiO_2$.

The capacitor device 100 includes an interlayer dielectric (ILD) 130. The ILD 130 may include a single-layered structure or a multi-layered structure. For example, the ILD 130 may be a tri-layered structure as shown in FIG. 1A, but the disclosure is not limited thereto. In some embodiments, the tri-layered ILD 130 may include dielectric films 132, 134 and 138. The dielectric films 132, 134 and 138 may include silicon oxide films. The ILD 130 covers the upper metal plate 114 of the upper electrode. Optionally, a protecting layer 120 is disposed between the ILD 130 and the upper metal plate 114 to protect an upper surface of the capacitor structure 110. The ILD 130 further covers the lower metal plate 112 of the lower electrode. The ILD 130 is disposed over a conductive line 116. The conductive line 116 is substantially leveled with the lower metal plate 112. The conductive line 116 may be formed of materials similar to those of the lower metal plate 112. In some embodiments, the conductive line 116 and the lower metal plate 112 are referred to as different segments of a same metal layer (also referred to as a metallization layer). The conductive line 116 may be spaced apart from the lower metal plate 112 by a spacing S1. The conductive line 116 is electrically isolated from the lower metal plate 112 of the lower electrode. In some embodiments, a thickness of the conductive line 116 is substantially identical to a thickness of the lower electrode of the capacitor structure 110. In some embodiments, the thickness of the conductive line 116 is substantially identical to a thickness of the lower metal plate 112 of lower electrode of the capacitor structure 110.

One or more via conductors 140 may be disposed in the ILD 130. The via conductor 140 penetrates the dielectric film 132 of the ILD 130 and contacts the conductive line 116. The via conductor 140 is electrically coupled on an upper surface of the conductive line 116. The via conductor 140 may laterally surround the capacitor structure 110. The conductive line 116 in combination with the via conductor 140 are disposed on a peripheral area surrounding the capacitor structure 110, and are electrically isolated from the capacitor structure 110. An upper surface 141a of the via conductor 140 is higher than an upper surface of the upper metal plate 114 of the capacitor structure 110, and a lower surface 141b of the via conductor 140 is substantially leveled with an upper surface of the lower metal plate 112 of the capacitor structure 110. The via conductor 140 may include a single-layered structure or a multi-layered structure. For example, the via conductor 140 may be a bi-layered structure as shown in FIG. 1A, but the disclosure is not limited thereto. In some embodiments, the bi-layered via conductor 140 may include a conductive layer 140a and a barrier metal layer 140b. The conductive layer 140a may be made of tungsten (W), and the barrier metal layer 140b may be made of TiN. Alternatively, the barrier metal layer 140b is omitted, and the conductive layer 140a may directly contact the ILD 130.

In some embodiments, a density of a conductive material of the via conductor 140 is greater than a density of a conductive material of the capacitor structure 110. For example, a density of the conductive layer 140a of the via conductor 140 is greater than a density of the lower metal plate 112 or the upper metal plate 114 of the capacitor structure 110. In some embodiments, a Mohs hardness of the conductive material of the via conductor 140 is greater than a Mohs hardness of the conductive material of the capacitor structure 110. For example, a Mohs hardness of the conductive layer 140a of the via conductor 140 is greater than a Mohs hardness of the lower metal plate 112 or the upper metal plate 114 of the capacitor structure 110. In some embodiments, a shear modulus of the conductive material of the via conductor 140 is greater than a shear modulus of the conductive material of the capacitor structure 110. For example, the shear modulus of the conductive layer 140a of the via conductor 140 is greater than a shear modulus of the lower metal plate 112 or the upper metal plate 114 of the capacitor structure 110. In some embodiments, the via conductor 140 is configured to be a seal ring structure to encircle the capacitor structure 110.

As shown in FIGS. 1A and 1B, one or more via conductors 142 and one or more via conductors 144 may be disposed in the ILD 130. The via conductor 142 is disposed adjacent to the capacitor structure 110 and electrically coupled to the lower electrode of the capacitor structure 110. The via conductor 142 is disposed between the capacitor structure 110 and the via conductor 140, as shown in FIG. 1B. In some embodiments, the via conductor 140 is configured to be a seal ring structure to encircle the capacitor structure 110 and the via conductor 142. The conductive line 116 in combination with the via conductor 140 surround the capacitor structure 110 and the via conductor 142. The via conductor 142 penetrates the dielectric film 132 of the ILD 130 and contacts the lower metal plate 112. The via conductor 142 is electrically connected to the lower metal plate 112. The via conductor 144 is disposed over the upper electrode of the capacitor structure 110 and electrically coupled to the upper electrode of the capacitor structure 110. The conductive line 116 in combination with the via conductor 140 surround the via conductor 144. The via conductor 144 penetrates the dielectric film 132 of the ILD 130 and contacts the upper metal plate 114. The via conductor 142 is electrically connected to the upper metal plate 114.

Each of the via conductors 142 and 144 may include a single-layered structure or a multi-layered structure. For example, the via conductors 142 and 144 may each have a bi-layered structure as shown in FIGS. 1A and 1B, but the disclosure is not limited thereto. In some embodiments, the bi-layered via conductor 142 may include a conductive layer 142*a* and a barrier metal layer 142*b*, and the bi-layered via conductor 144 may include a conductive layer 144*a* and a barrier metal layer 144*b*. The bi-layered via conductor 142 and the bi-layered via conductor 144 may be formed of materials similar to those of the bi-layered via conductor 140, and related details are omitted herein for brevity. The upper surface 141*a* of the via conductor 140 is leveled with an upper surface 143*a* of the via conductor 142, and the lower surface 141*b* of the via conductor 140 is leveled with a lower surface 143*b* of the via conductor 142. Alternatively or additionally, the upper surface 141*a* of the via conductor 140 is at least leveled with one of the upper surface 143*a* of the via conductor 142 and an upper surface 145*a* of the via conductor 144.

A metal layer may be disposed over the capacitor structure 110 and embedded in the ILD 130. The metal layer may include one or more metal lines 150, 152 and 154. The metal lines 150, 152 and 154 may respectively be disposed over and electrically connected to the via conductor 140, the via conductor 142, and the via conductor 144. The metal line 150 is substantially leveled with the metal line 152. The metal line 150 is substantially leveled with the metal line 154. Each of the metal lines 150, 152 and 154 may include a single-layered structure or a multi-layered structure. For example, the metal lines 150, 152 and 154 may each have a tri-layered structure as shown in FIGS. 1A and 1B, but the disclosure is not limited thereto. In some embodiments, the tri-layered metal line 150 may include a conductive layer 150*a*, a protecting layer 150*b*, and a barrier layer 150*c*. The conductive layer 150*a* may be made of tungsten (W), and the barrier layer 150*c* may be made of TiN. Alternatively, the protecting layer 150*b* and the barrier layer 150*c* are omitted, and the conductive layer 150*a* may directly contact the conductive layer 140*a*. The tri-layered metal line 152 may include a conductive layer 152*a*, a protecting layer 152*b*, and a barrier layer 152*c*, and the tri-layered metal line 154 may include a conductive layer 154*a*, a protecting layer 154*b*, and a barrier layer 154*c*. The tri-layered metal line 152 and the tri-layered metal line 154 may be formed of materials similar to those of the tri-layered metal line 150, and related details are omitted herein for brevity.

A via layer may be disposed over the capacitor structure 110 and embedded in the ILD 130. The via layer may include one or more via conductors 160, 162, and 164. The via conductors 160, 162, and 164 may respectively be disposed over and electrically connected to the metal lines 150, 152 and 154. Each of the via conductors 160, 162 and 164 may include a single-layered structure or a multi-layered structure. For example, the via conductors 160, 162 and 164 may each have a bi-layered structure as shown in FIGS. 1A and 1B, but the disclosure is not limited thereto. In some embodiments, the bi-layered via conductors 160, 162 and 164 may respectively include a conductive layer 160*a*, 162*a* and 164*a* and a barrier metal layer 160*b*. 162*b* and 164*b*. The bi-layered via conductors 160, 162 and 164 may be formed of materials similar to those of the bi-layered via conductors 142 and 144, and related details are omitted herein for brevity.

Another metal layer may be disposed over the capacitor structure 110 and embedded in the ILD 130. The metal layer may include one or more metal lines 170, 172, and 174. The metal lines 170, 172 and 174 may respectively be disposed over and electrically connected to the via conductors 160, 162 and 164. The metal lines 170, 172 and 174 may respectively electrically connected to the metal lines 150, 152 and 154. The via conductor 160 is coupled between the metal line 150 and the metal line 170. The via conductor 162 is coupled between the metal line 152 and the metal line 172. The via conductor 164 is coupled between the metal line 154 and the metal line 174. In some embodiments, the metal line 170 is embedded in the ILD 130, and the metal lines 172 and 174 are exposed from the ILD 130. Each of the metal lines 170, 172 and 174 may include a single-layered structure or a multi-layered structure. For example, the metal lines 170, 172 and 174 may each have a tri-layered structure as shown in FIGS. 1A and 1B, but the disclosure is not limited thereto. In some embodiments, the tri-layered metal lines 170, 172 and 174 may respectively include a conductive layer 170*a*, 172*a* and 174*a*, a protecting layer 170*b*, 172*b* and 174*b*, and a barrier layer 170*c*, 172*c* and 174*c*. The tri-layered metal lines 170, 172 and 174 may be formed of materials similar to those of the tri-layered metal lines 150, 152 and 154, and related details are omitted herein for brevity.

One or more conductive terminals 182 and 184 may respectively be disposed over and electrically connected to the metal lines 172 and 174. Each of the conductive terminals 182 and 184 may be respectively attached to and disposed on the metal lines 172 and 174. The conductive terminals 182 and 184 are respectively configured to electrically couple to a power signal or a ground signal. The conductive terminals 182 and 184 may be controlled collapse chip connection (C4) solder bumps, gold bumps, or micro-bumps. The capacitor device 100 further includes a passivation layer 136 disposed over the ILD 130. The passivation layer 136 functions as a protective film that improves mechanical strength of the conductive terminals 182 and 184. The passivation layer 136 may be made of polyimide.

The capacitor structure 110 may be electrically coupled to the conductive terminals 182 and 184 at the upper surface 104 of the capacitor device 100 through the metal lines 152, 154, 172 and 174 and the via conductors 142, 144, 162 and 164. The conductive terminals 182 and 184 (or the metal lines 172 and 174 that respectively receive the conductive terminals 182 and 184) may be implemented as different terminals of the capacitor structure 110. For example, the conductive terminal 182 is implemented as a terminal of the capacitor structure 110 electrically coupled to a power signal, and the conductive terminal 184 is implemented as a terminal of the capacitor structure 110 electrically coupled to a power signal. Accordingly, by electrically coupling to the conductive terminals 182 and 184, the capacitor structure 110 in the capacitor device 100 may be electrically coupled to the power signal (e.g., a VDD pad) and the ground signal (e.g., a VSS pad) of an active wafer (not shown).

Since the via conductor 140 is electrically coupled to the conductive line 116 that is electrically isolated from the lower metal plate 112, the via conductor 140 is electrically isolated from the conductive terminals 182 and 184. The via conductor 140, the metal line 150, the via conductor 160 and the metal line 170 are electrically connected to each other and function as an integral seal ring structure. The seal ring structure laterally surrounds the functional area of the capacitor structure 110 from top to bottom. The seal ring structure is made of conductive materials having greater density, greater shear modulus and greater Mohs hardness than those of the capacitor structure 110. Accordingly, the seal ring structure may protect the functional area of the capacitor structure 110, and prevent the functional area of the capacitor structure 110 from being damaged during a singulation operation.

FIG. 2 illustrates a top view of the capacitor device 100 in a state where no metal line 150, 152 or 154 is formed. The capacitor device of FIG. 2 includes a plurality of capacitor cells formed on a rectangular semiconductor substrate (not shown) having sides extending along a first direction and a second direction orthogonal to each other. In this specification, the X direction in FIG. 2 or the like is also referred to as a first direction, and the Y direction is also referred to as a second direction. For the purpose of simplicity and clarity, FIG. 2 only illustrates the lower metal plate 112, the upper metal plate 114, the conductive line 116, and the via conductors 140, 142 and 144.

As shown in FIG. 2, from the top view, the lower metal plate 112 includes a plurality of lower metal plates 112 forming an array of discrete patterns, and the upper metal plate 114 includes a plurality of upper metal plates 114 forming an array of discrete patterns. Each upper metal plate 114 is arranged so as to be shifted from the lower metal plate 112. Each lower metal plate 112 and each upper metal plate 114 are partly opposed and capacitively coupled to each other, and each pair of lower metal plate 112 and upper metal plate 114 that are capacitively coupled to each other form a capacitor cell. As shown in FIG. 2, from the top view, the via conductor 142 includes a plurality of via conductors 142 forming an array of discrete patterns, and the via conductor 144 includes a plurality of via conductors 144 forming an array of discrete patterns. Each via conductor 142 is arranged so as to be shifted from the via conductor 144. The via conductors 142 and 144 respectively electrically coupled to the lower metal plate 112 and upper metal plate 114. The via conductors 142 and 144 may be referred to as cell terminals of the capacitor cells.

As shown in FIG. 2, from the top view, the upper surface of the conductive line 116 form a continuous pattern. The conductive line 116 encircles the lower metal plate 112, the upper metal plate 114, and the via conductors 142 and 144. The upper surface of the via conductor 140 also forms a continuous pattern. The via conductor 140 surrounds the array of discrete patterns of the via conductor 142. The via conductor 140 surrounds the array of discrete patterns of the via conductor 144. The via conductor 140 encircles the lower metal plate 112, the upper metal plate 114, and the via conductors 142 and 144. In other words, the via conductor 140 encircles the capacitor structure 110 from the top view.

Figure 3:
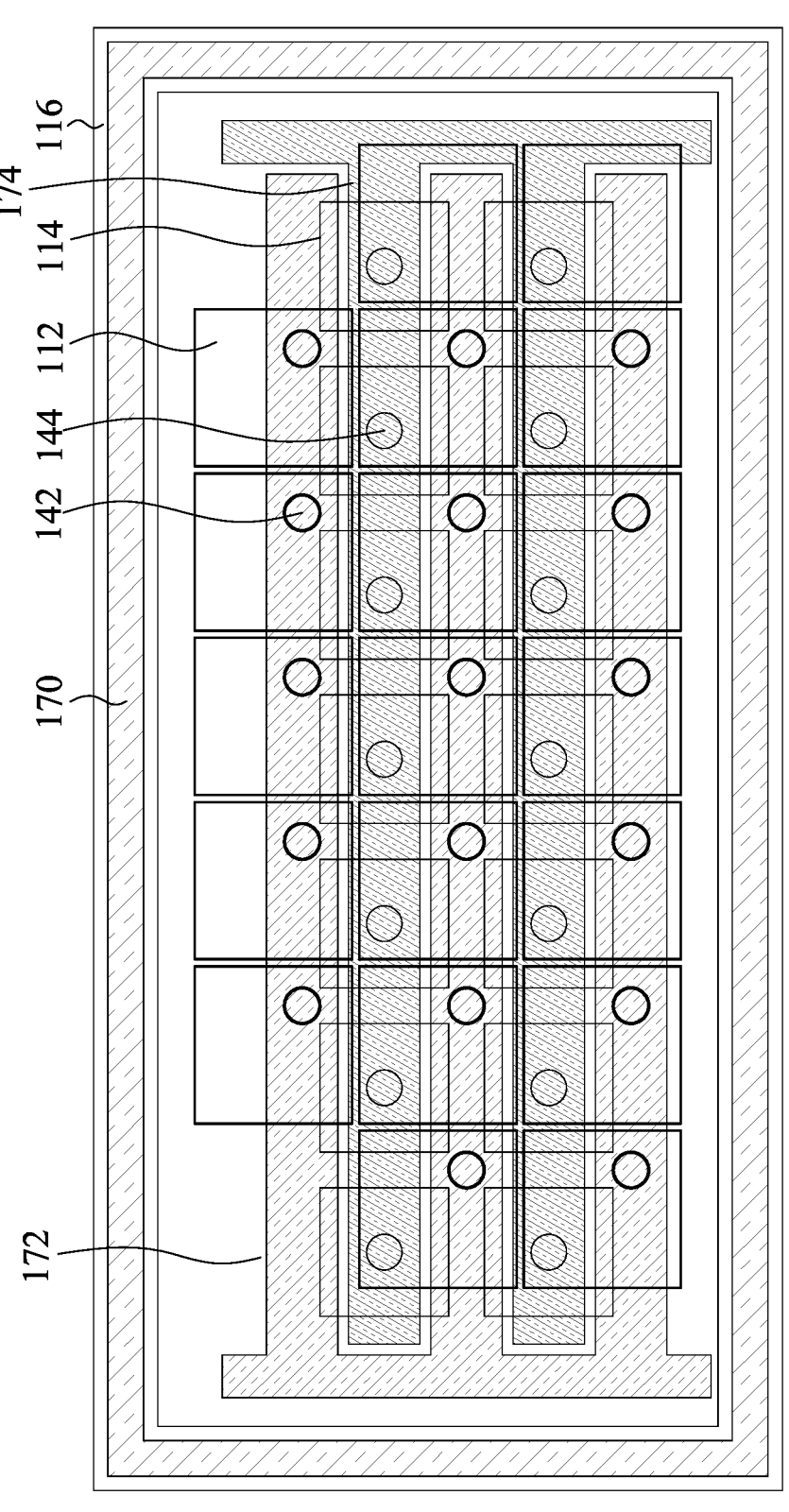
FIG. 3 illustrates a top view of a capacitor device according to some embodiments of the present disclosure in which metal lines are formed in the capacitor device of FIG. 2.

FIG. 3 illustrates a top view of the capacitor device 100 in which metal lines 170, 172 and 174 are formed in the capacitor device 100 of FIG. 2. Each metal line 172 and 174 is electrically connected to a part of the plurality of cell terminals including the via conductors 142 and 144, respectively. In the example of FIG. 3, each metal line 172 and 174 has a comb shape. The metal line 172 includes a plurality of first portions (portions extending in the X direction) electrically connected to the via conductor 142, and a second portion (a portion extending in the Y direction) that connects the first portions to each other. The metal line 174 includes a plurality of first portions (portions extending in the X direction) electrically connected to the via conductor 144, and a second portion (a portion extending in the Y direction) that connects the first portions to each other. Each first portion of the metal line 172 and each first portion of the metal line 174 are formed so as to be fitted to each other. Each of the metal lines 172 and 174 is arranged such that every rows of the plurality of cell terminals are electrically connected to the metal lines 172 and 174 alternately. As shown in FIG. 3, from the top view, the upper surface of the metal line 170 form a continuous pattern. The metal line 170 encircles the metal lines 172 and 174 from the top view.

Figure 4:
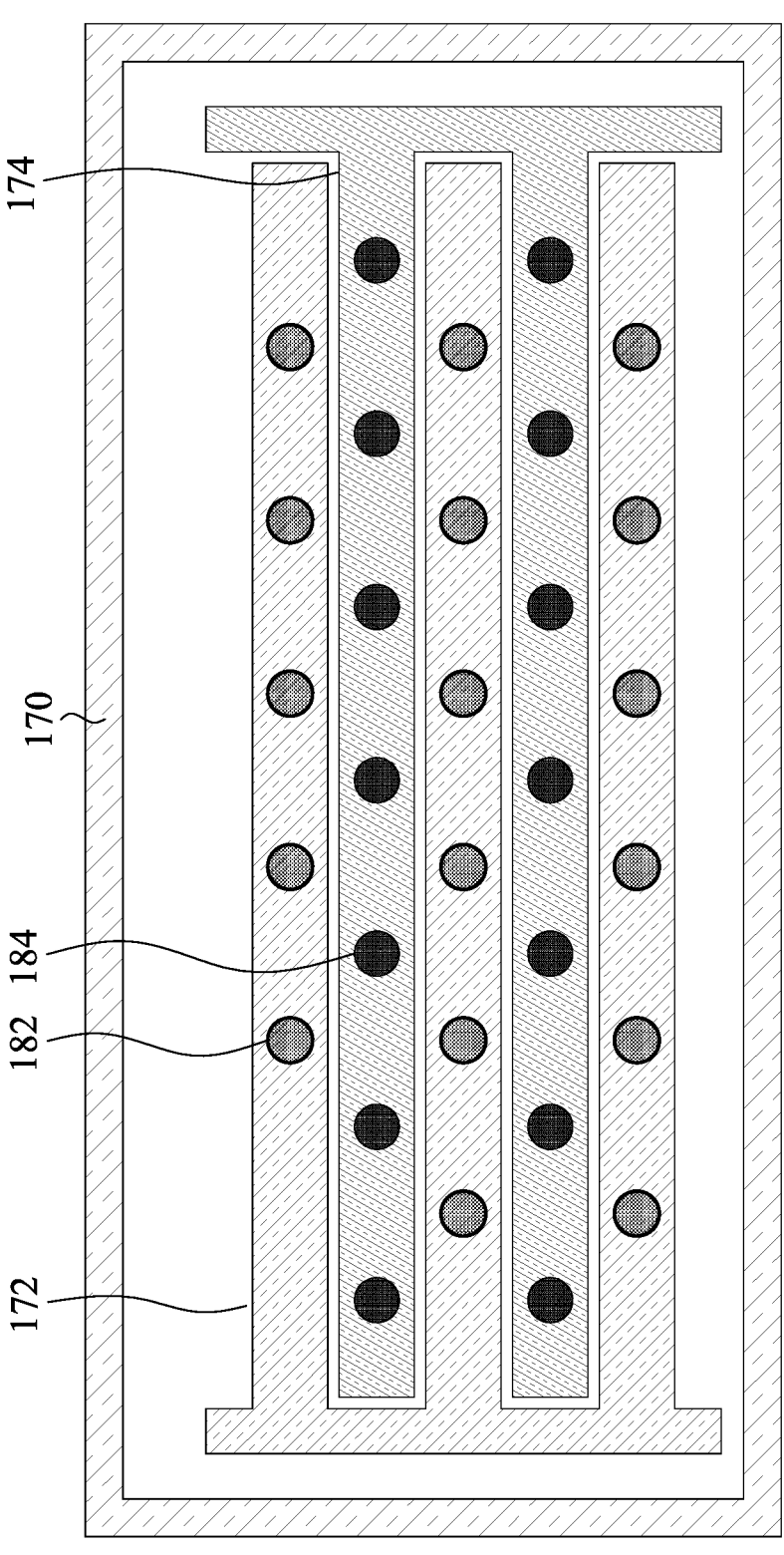
FIG. 4 illustrates a top view of a capacitor device according to some embodiments of the present disclosure in which conductive terminals are formed in the capacitor device of FIG. 3.

FIG. 4 illustrates a top view of the capacitor device 100 in which conductive terminals 182 and 184 are formed in the capacitor device 100 of FIG. 3. The conductive terminal 182 includes a plurality of conductive terminal 182 forming an array of discrete patterns and electrically coupled to the metal line 172. The conductive terminal 184 includes a plurality of conductive terminal 184 forming an array of discrete patterns and electrically coupled to the metal line 174. The conductive terminals 182 and 184 can be connected to a voltage source having an arbitrary voltage. For example, one of them may be connected to a power source and the other may be grounded.

Figure 5:
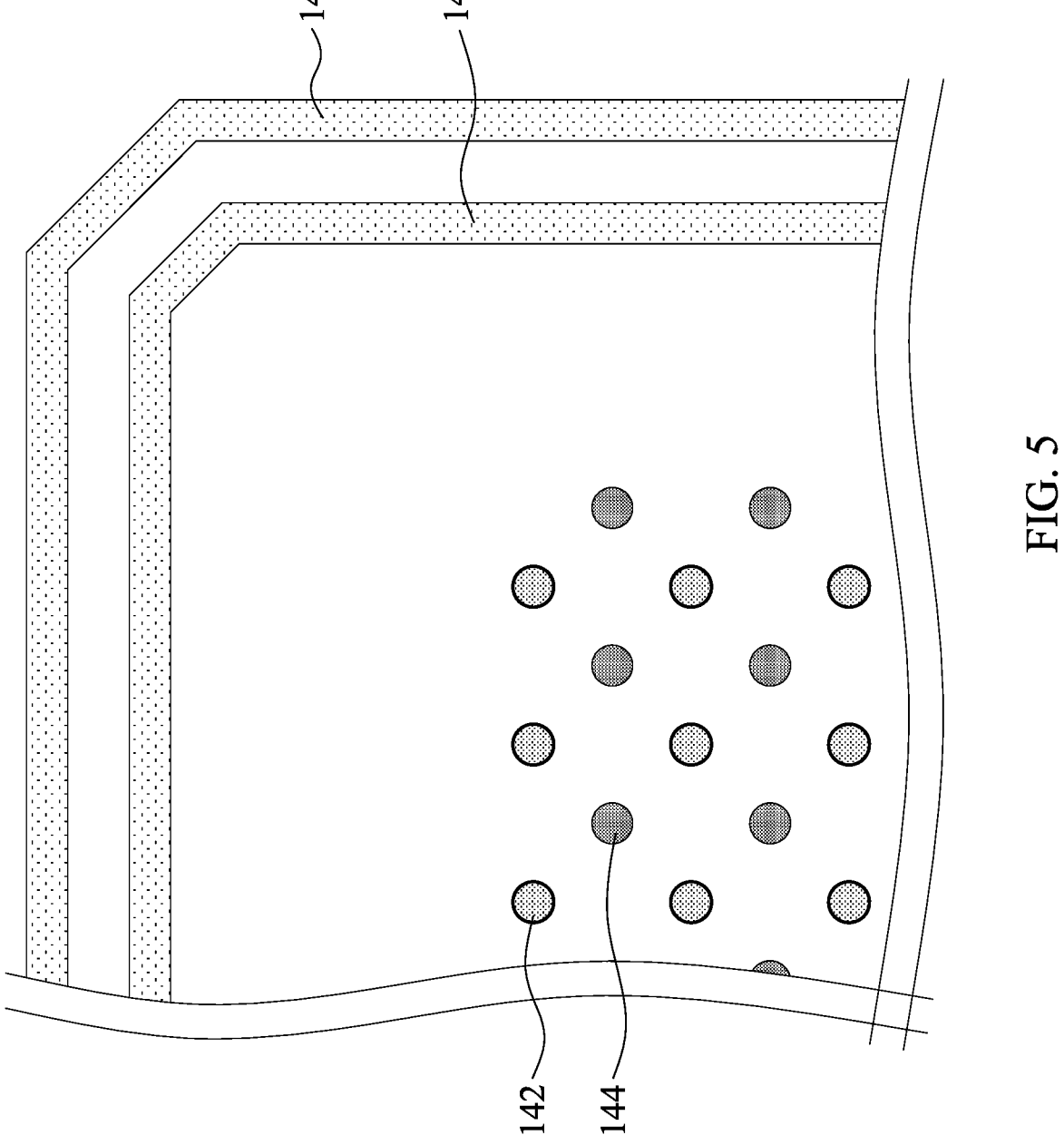
FIG. 5 illustrates a layout of a capacitor device according to some embodiments of the present disclosure in a state where no metal line is formed.

FIG. 5 illustrates a fragmentary diagrammatic view of a layout of the capacitor device 100 in a state where no metal line 150, 152 or 154 is formed. For the purpose of simplicity and clarity, FIG. 5 only illustrates the via conductors 140, 142 and 144. As shown in FIG. 5, the upper surface of the via conductor 140 form a continuous pattern, and the upper surface of the via conductor 142 or 144 form a plurality of discrete patterns. The upper surface of the via conductor 140 may have a moat-like shape, and the upper surface of the via conductor 142 or 144 may have a hole-like shape from the top view. The via conductor 140 encircles the capacitor structure 110 (where the via conductor 142 or 144 resides) from the top view. A dimension of the upper surface of the via conductor 140 is greater than a dimension of the upper surface of the via conductor 142 or 144 from the top view. For example, a length of the upper surface of the via conductor 140 is greater than a diameter of the upper surface of the via conductor 142 or 144. In some embodiments, the via conductor 140 includes two adjacent conductive seal rings to encircle the capacitor structure 110 and the via conductor 142.

Figure 6:
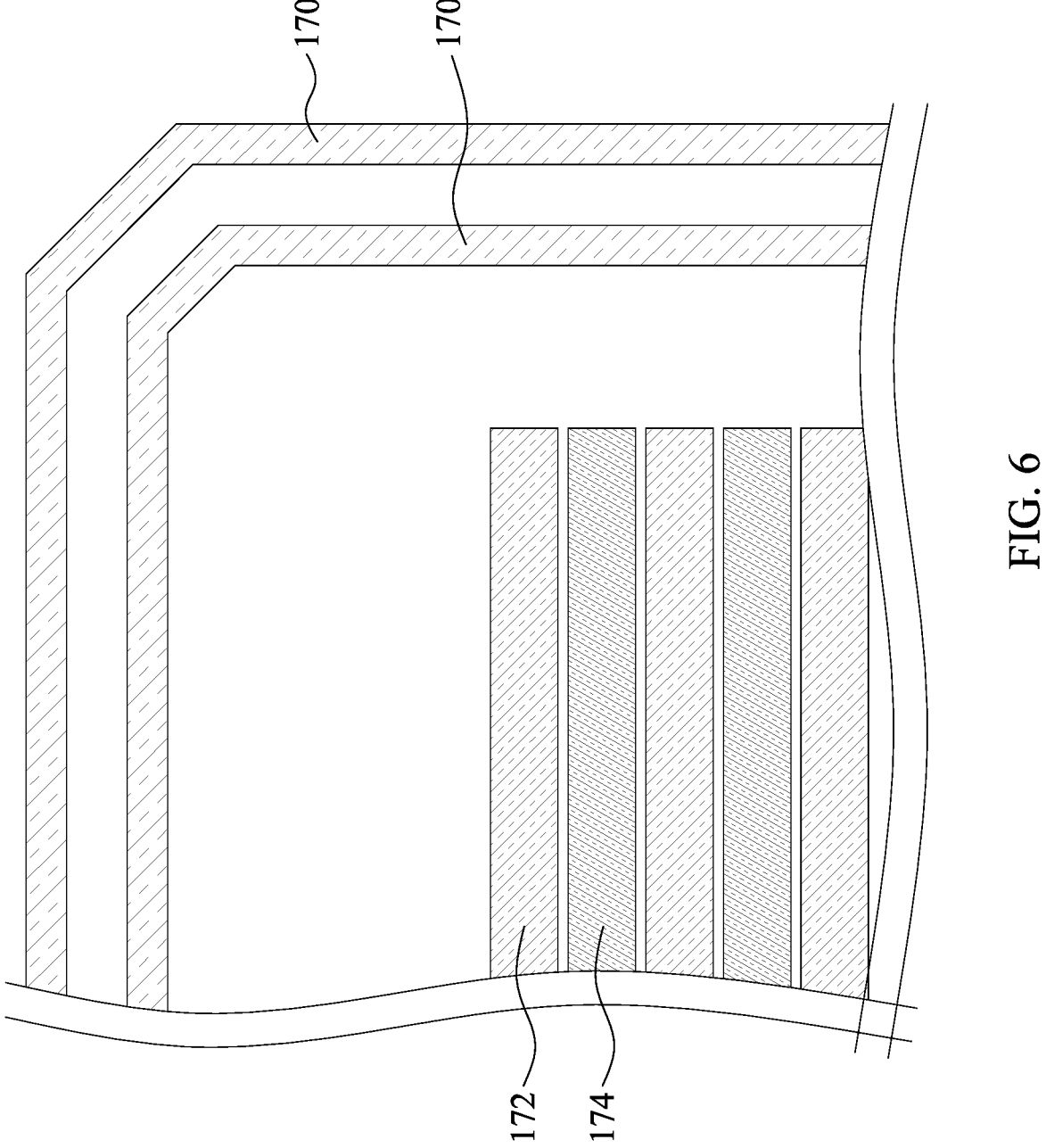
FIG. 6 illustrates a layout of a capacitor device according to some embodiments of the present disclosure in which metal lines are formed in the capacitor device of FIG. 5.

FIG. 6 illustrates a layout of the capacitor device 100 in which metal lines 170, 172 and 174 are formed in the capacitor device 100 of FIG. 5. As shown in FIG. 6, the metal line 170 encircles the capacitor structure 110 (where the metal lines 172 and 174 reside) from the top view. In some embodiments, the metal line 170 includes two adjacent trenches filled with conductive materials. In other words, the capacitor device 100 may have more than one integral seal ring structure. The number of the seal ring structures may be altered according to different design requirements.

Figure 7:
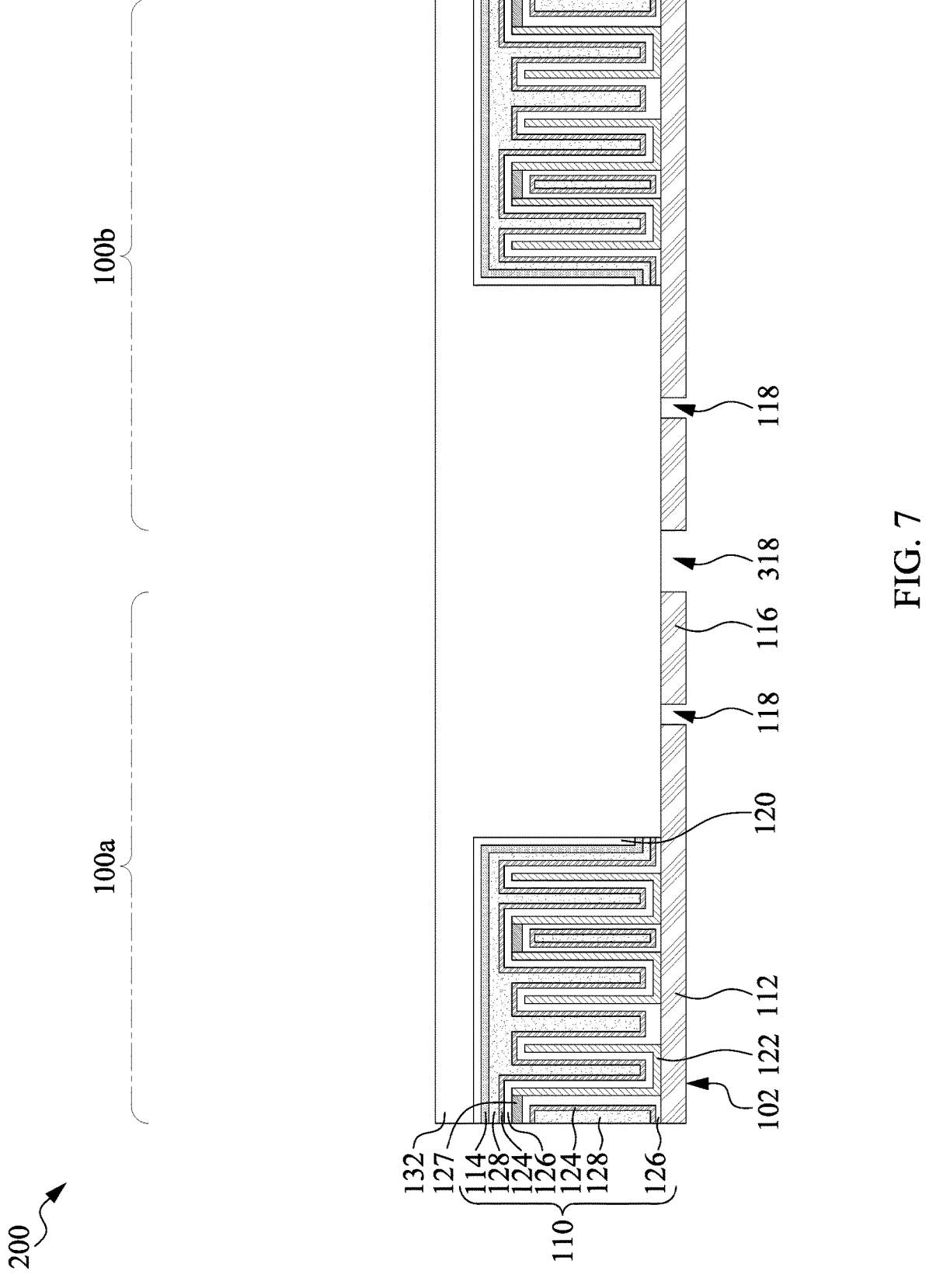
FIGS. 7 to 13 illustrate cross-sectional views of formation of a capacitor device according to some embodiments of the present disclosure.

FIGS. 7 to 13 illustrate stages during the manufacture of the capacitor device 100 as shown in FIGS. 1A and 1B according to some embodiments. As shown in FIG. 7, in some embodiments, a capacitor wafer 200 (also referred to as an integrated passive device (IPD) wafer) is received. The capacitor wafer 200 includes one or more capacitor structures 110. FIG. 7 may be a fragmentary diagrammatic view of part or all of the capacitor wafer 200. FIG. 7 has been simplified for the sake of clarity to better present the inventive concepts of the present disclosure. Additional features may be added to the capacitor wafer 200, and some of the features described below may be replaced, modified, or eliminated in other embodiments of the capacitor wafer 200.

In some embodiments, the capacitor wafer 200 includes an oxide film (not shown) exposed on the lower surface 102. The capacitor wafer 200 may include a semiconductor substrate (not shown) underlying the oxide film. A metal layer including the lower metal plates 112 and the conductive lines 116 may be formed over the oxide film. A trench 118 may be formed between the lower metal plate 112 and the conductive line 116 to separate the lower metal plate 112 from the conductive line 116. The capacitor wafer 200 may include a plurality of die regions, and the present disclosure only shows two of the die regions (for forming the capacitor devices 100a and 100b) in the illustration. A trench 318 may be formed between the conductive lines 116 of different capacitor devices 100a and 100b to separate the capacitor device 100a from the capacitor device 100b. In some embodiments, the trenches 118 and 318 are filled with dielectric materials similar to those of the oxide film. Each conductive line 116 may surround the respective capacitor structure 110 of the capacitor devices 100a and 100b.

Figure 8:
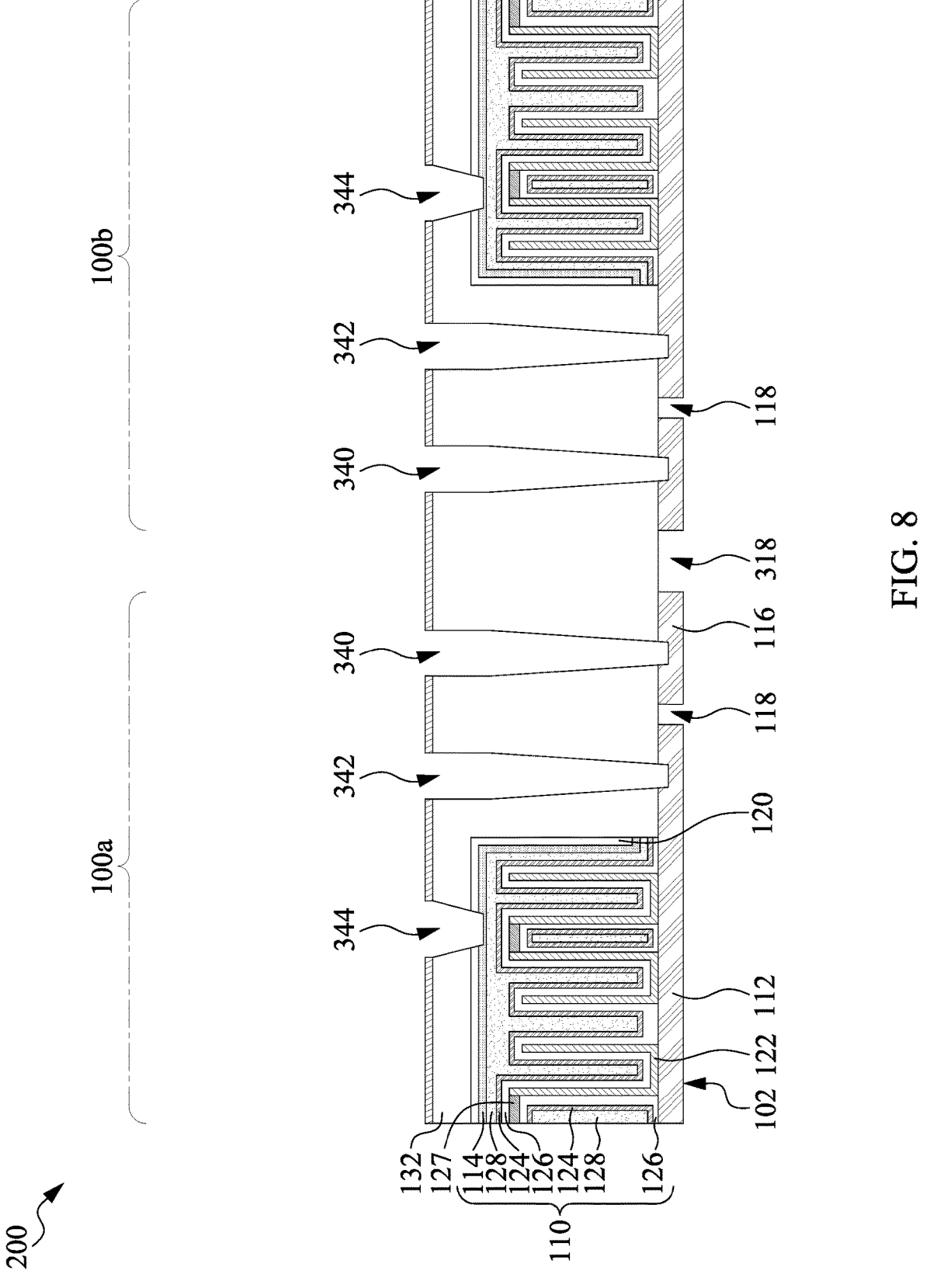

As shown in FIG. 8, in some embodiments, one or more trenches 340, and one or more recesses 342 and 344 may be formed. The trench 340 may be a continuous trench in the dielectric film 132 of the ILD 130 embedding the capacitor structure 110. The recesses 342 and 344 may be formed by via etching operations. The recesses 342 and 344 may be a plurality of discrete recesses in the dielectric film 132 of the ILD 130. As one example, the formation of the trench 340, and the recesses 342 and 344 includes a photolithography patterning process and an etching process to etch the trench 340, and the recesses 342 and 344 in the dielectric film 132 of the ILD 130. The photolithography patterning processes include photoresist coating (e.g., spin-on coating), soft baking, mask aligning, exposure, post-exposure baking, developing the photoresist, rinsing, drying (e.g., hard baking), other suitable processes, and/or combinations thereof. The etching processes include dry etching, wet etching, and/or other etching methods (e.g., reactive ion etching).

In some embodiments, the formation of the continuous trench 340 and the formation of the discrete recesses 342 and 344 are performed in a single operation. The etching process may be selectively tuned to remove the dielectric material of the dielectric film 132 but not the conductive material of the upper metal plate 114, the conductive material of the lower metal plate 112 and the conductive material of the conductive line 116. In other words, the conductive material of the upper metal plate 114, the conductive material of the lower metal plate 112 and the conductive material of the conductive line 116 may serve as an etch stop during the etching process. For example, the etching stops at the lower metal plate 112 for forming the recess 342, the etching stops at the upper metal plate 114 for forming the recess 344, and the etching stops at the conductive line 116 for forming the via trench 340. Accordingly, the trench 340 and the recesses 342 and 344 may be concurrently formed in a same etching process. A depth of the trench 340 may be substantially equal to a depth of the recess 342. The depth of the recess 342 may be greater than a depth of the recess 344. A length of the trench 340 is greater than a length (or a diameter) of the recess 342 from the top view.

Figure 9:
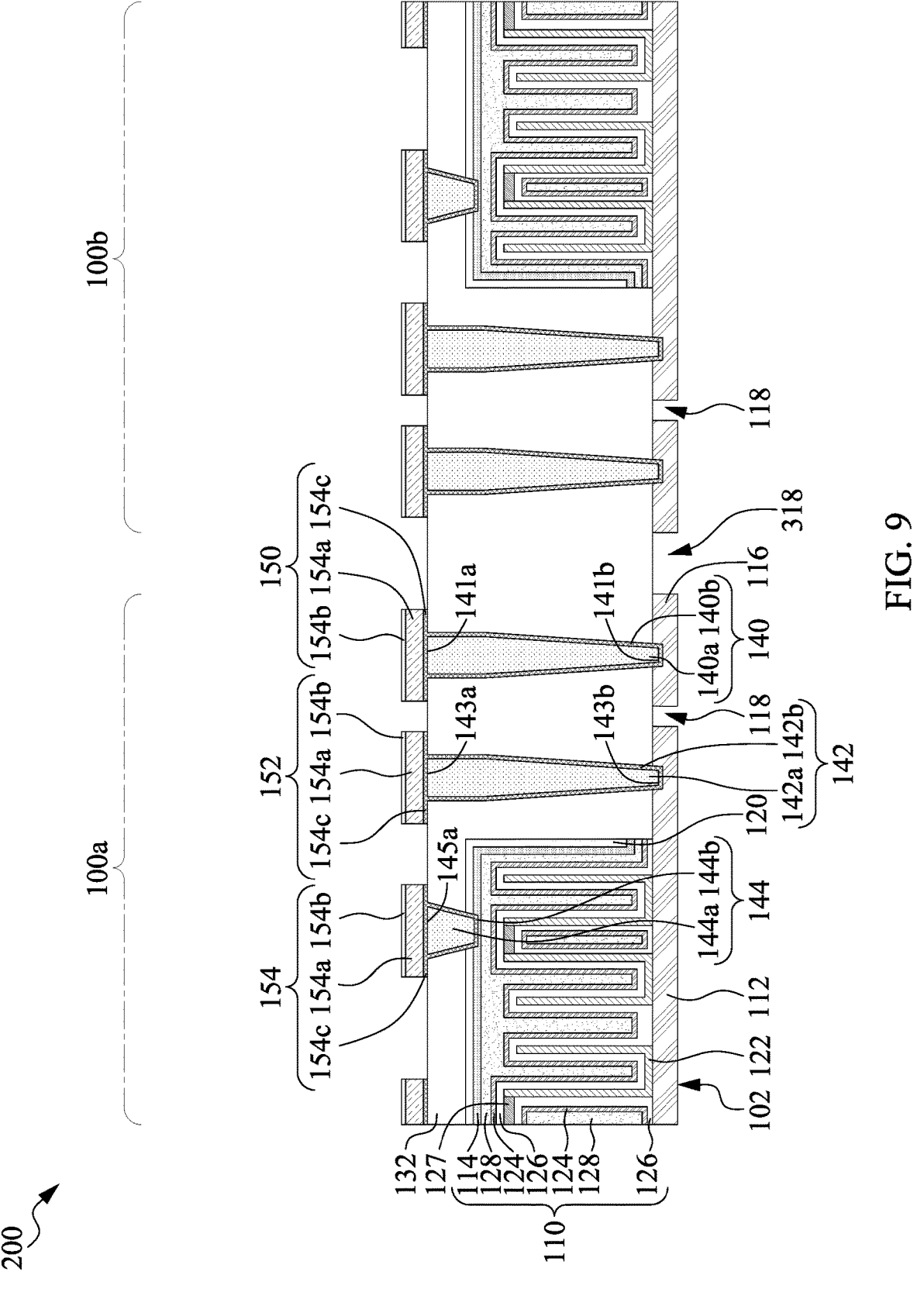

As shown in FIG. 9, in some embodiments, the trench 340, and the recesses 342 and 344 are filled with conductive materials to form the via conductor 140, the via conductor 142 and the via conductor 144. The trench 340, and the recesses 342 and 344 may be filled with conductive materials through electroplating operations. Alternatively, the trench 340, and the recesses 342 and 344 may be filled with conductive materials through deposition operations. The deposition operations include chemical vapor deposition (CVD), physical vapor deposition (PVD), atomic layer deposition (ALD), other suitable methods, and/or combinations thereof. Each via conductor 142 is formed on and is electrically connected to the respective lower metal plate 112. Each via conductor 144 is formed on and is electrically connected to the respective upper metal plate 114. Each via conductor 140 is formed on the respective conductive line 116, and each via conductor 140 laterally surrounds the respective capacitor structure 110. Each via conductor 140 is electrically isolated from the respective capacitor structure 110 due to the presence of the trench 118.

After the formation of the via conductor 140, the via conductor 142 and the via conductor 144, the metal lines 150, 152 and 154 may respectively be formed over and electrically connected to the via conductors 140, the via conductor 142 and the via conductor 144. The metal lines 150, 152 and 154 are formed by any suitable process or processes. For example, the metal lines 150, 152 and 154 can be formed by a procedure including deposition, photolithography patterning, and etching processes. The deposition processes include chemical vapor deposition (CVD), physical vapor deposition (PVD), atomic layer deposition (ALD), other suitable methods, and combinations thereof. The photolithography patterning processes include photoresist coating (e.g., spin-on coating), soft baking, mask aligning, exposure, post-exposure baking, developing the photoresist, rinsing, drying (e.g., hard baking), other suitable processes, and combinations thereof. The etching processes include dry etching, wet etching, and other etching methods (e.g., reactive ion etching).

Figure 10:
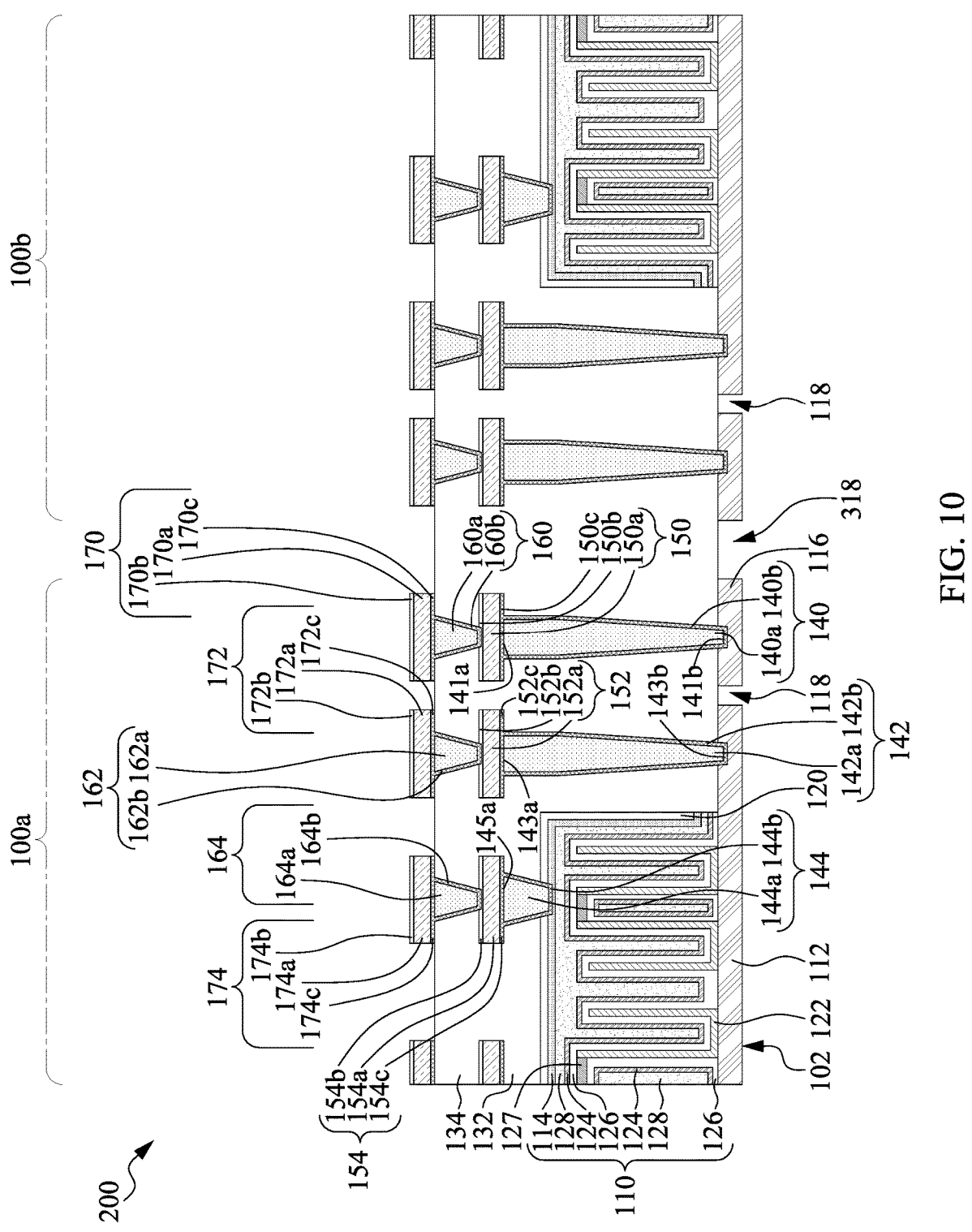

As shown in FIG. 10, in some embodiments, another dielectric film 134 is formed over the metal lines 150, 152 and 154. The dielectric film 134 may be formed of materials similar to those of the dielectric film 132. The via conductors 160, 162 and 164 may respectively be formed over and electrically connected to the metal lines 150, 152 and 154. The via conductors 160, 162 and 164 may be formed of materials similar to, and by processes similar to, those of the via conductor 140 and the via conductors 142 and 144. The metal lines 170, 172 and 174 may respectively be formed over and electrically connected to the via conductors 160, 162 and 164. The metal lines 170, 172 and 174 may be formed of materials similar to, and by processes similar to, those of the metal lines 150, 152 and 154.

Figure 11:
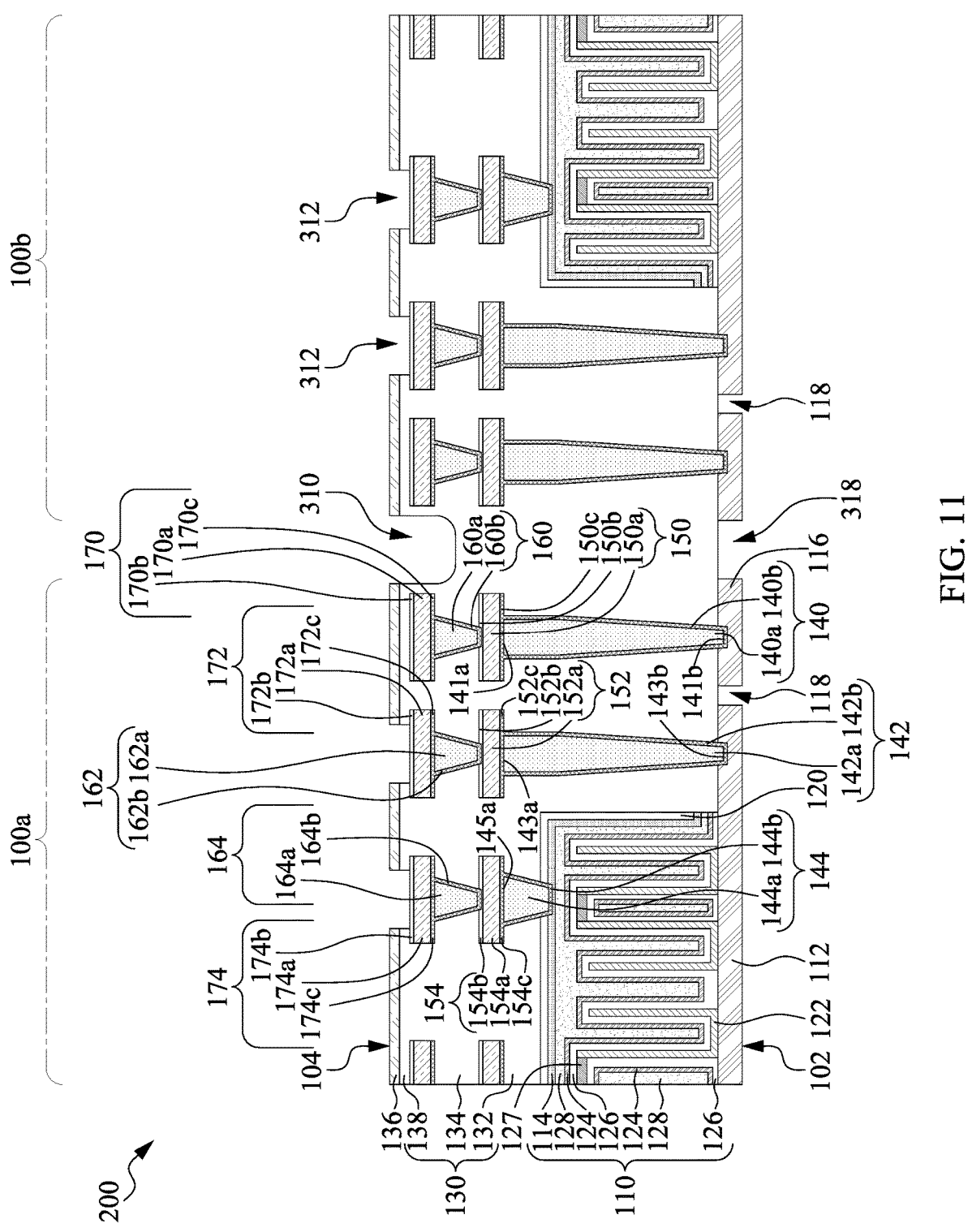

As shown in FIG. 11, in some embodiments, another dielectric film 138 is formed over the dielectric film 134. The dielectric film 138 may be formed of materials similar to those of the dielectric film 134. The dielectric film 138, the dielectric film 134 and the dielectric film 132 collectively define a continuous interlayer dielectric layer, i.e., the ILD 130. The passivation layer 136 is formed over the ILD 130. One or more openings 310 may be formed in the passivation layer 136 to define a location of a scribe line for a subsequent singulation operation. The opening 310 may be formed between two adjacent via conductors 140 of different capacitor devices 100a and 100b. Additionally, one or more openings 312 may be formed in the passivation layer 136 to define locations of the conductive terminals 182 and 184. The openings 310 and 312 are formed by any suitable process or processes. For example, the openings 310 and 312 can be formed by a procedure including photolithography patterning and etching processes.

Figure 12:
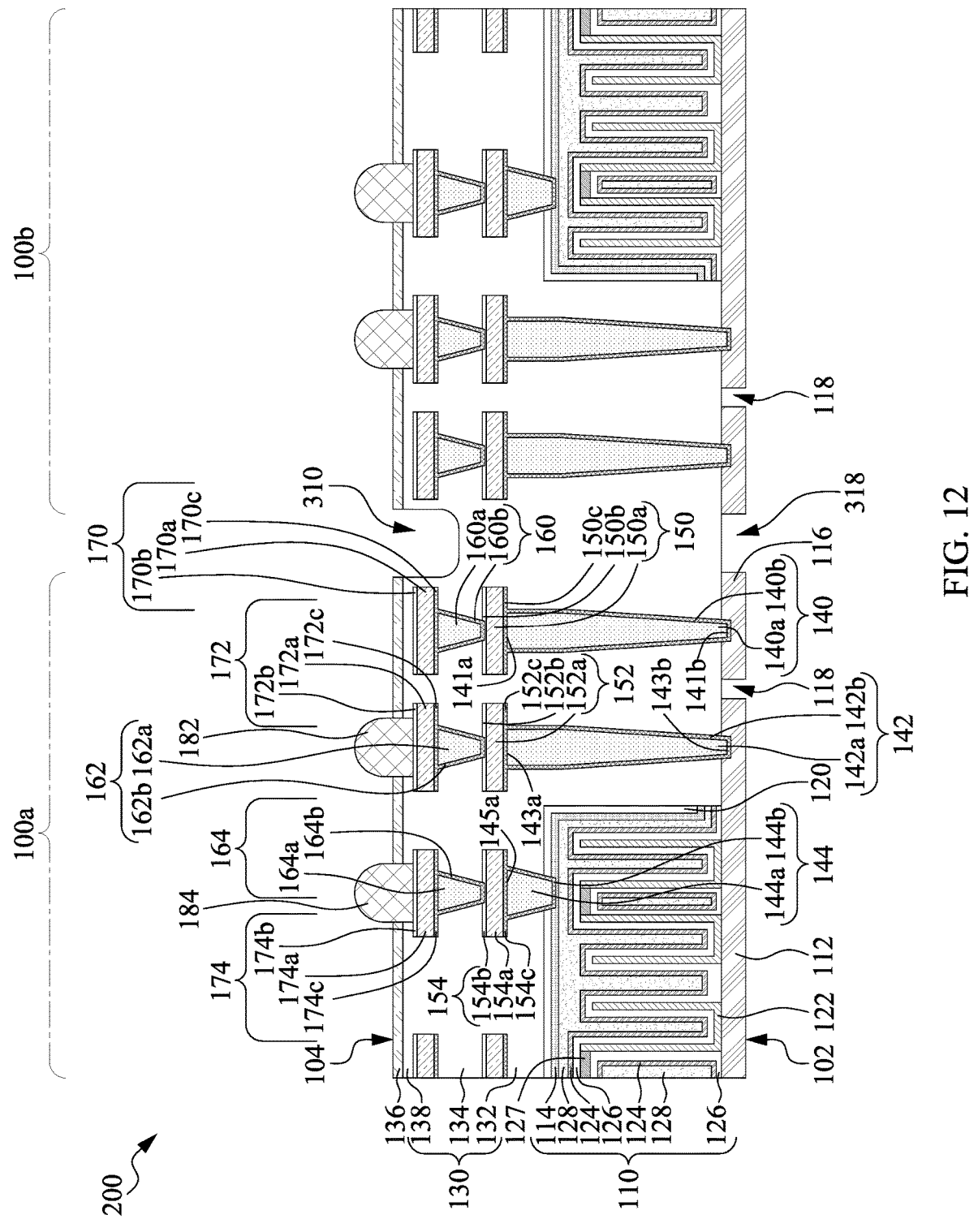

As shown in FIG. 12, in some embodiments, the conductive terminals 182 and 184 may respectively be disposed in contact with the metal lines 172 and 174 for electrical connection to other semiconductor structures or devices such as an interposer or a PCB. In some embodiments, the conductive terminals 182 and 184 are formed of a low melting point material, which can be formed by a low temperature operation.

Figure 13:
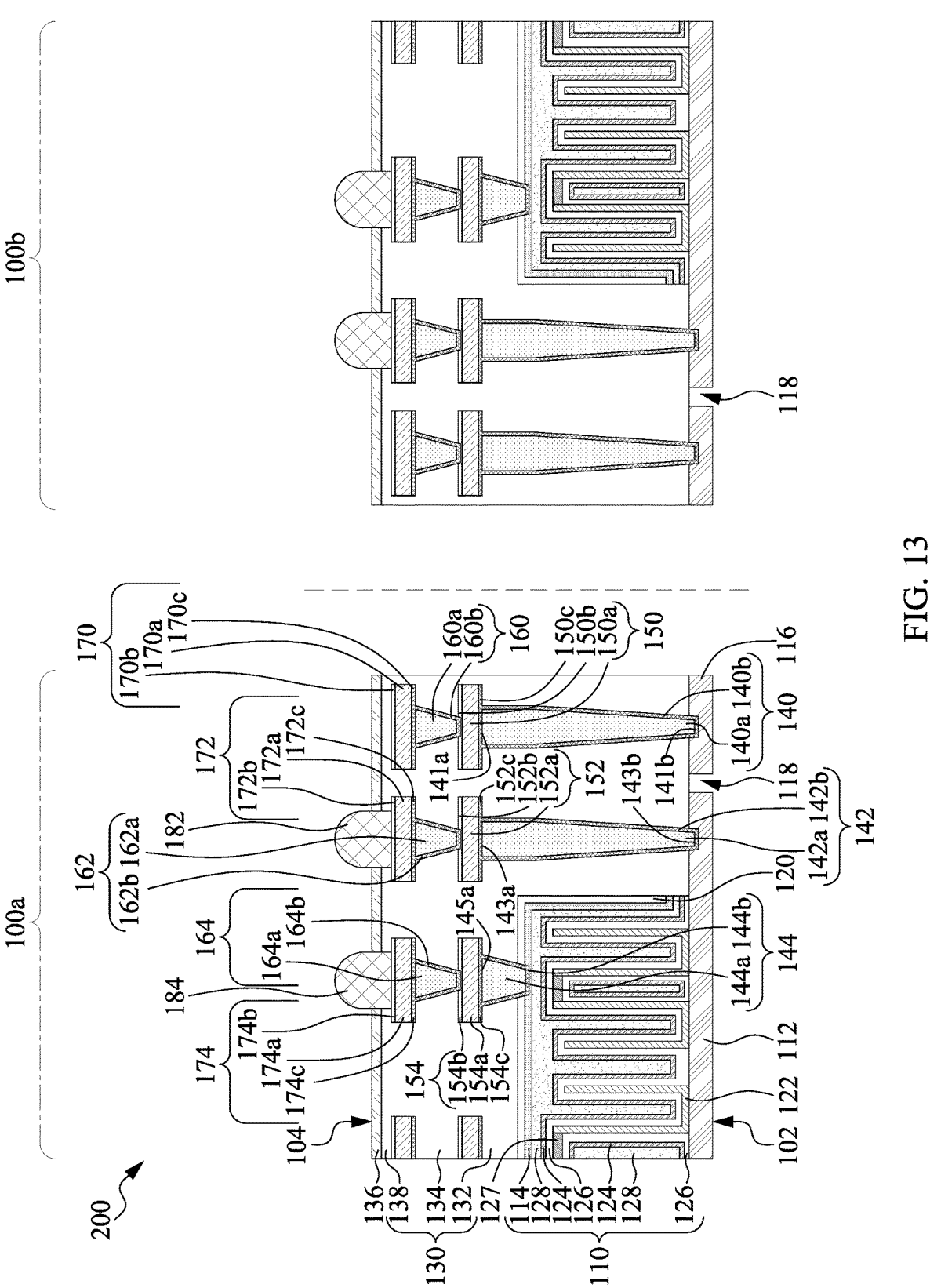

As shown in FIG. 13, in some embodiments, the capacitor wafer 200 is singulated to obtain the capacitor devices 100a and 100b. The capacitor wafer 200 may be divided by sawing or other suitable cutting methods. The singulation operation includes forming an opening between two adjacent via conductors 140 of different capacitor devices 100a and 100b.

The presence of the via conductor 140 or the seal ring structure (i.e., the via conductor 140, the metal line 150, the via conductor 160 and the metal line 170) provides advantages. In some comparative embodiments where the via conductor 140 is absent, the capacitor structure 110 may suffer damage, such as die chipping, die edge cracking, or defect intrusion, during the singulation operation, which may degrade the reliability of the capacitor structure 110. The via conductor 140 laterally surrounds the capacitor structure 110, and fully covers a functional area of the capacitor structure 110 from top to bottom. The via conductor 140 is electrically isolated from the capacitor structure 110. The via conductor 140 is made of a material having greater density and hardness than those of the capacitor structure 110. Hence, the via conductor 140 may protect the capacitor structure 110 and prevent the capacitor structure 110 from potential damage during the singulation operation. Accordingly, the damage to the capacitor structure 110 may be reduced. Moreover, a better performance of the capacitor device 100 may be achieved.

Briefly, according to the abovementioned embodiments, the seal ring structure laterally surrounds the functional area of the IPD device from top to bottom. The seal ring structure is electrically isolated from the IPD device. The seal ring structure is made of materials having greater density and hardness than those of the IPD device. Accordingly, the seal ring structure may protect the functional area of the IPD device, and prevent the functional area of the IPD device from being damaged during a singulation operation. Accordingly, the damage to the IPD device may be reduced.

In one exemplary aspect, a capacitor device is provided. The capacitor device includes a capacitor structure, a conductive line, an interlayer dielectric (ILD) and a first via conductor. The capacitor structure includes a lower electrode and an upper electrode. The conductive line is leveled with the lower electrode and electrically isolated from the lower electrode. The ILD is disposed over the capacitor structure and the conductive line. The first via conductor is adjacent to the capacitor structure and electrically coupled on an upper surface of the conductive line.

In another exemplary aspect, a capacitor device is provided. The capacitor device includes a capacitor structure, a first via conductor and a second via conductor. The capacitor structure includes a lower electrode and an upper electrode. The first via conductor is electrically connected to the lower electrode. The second via conductor is adjacent to the first via conductor and electrically isolated from the first via conductor. The second via conductor is configured to be a seal ring structure to encircle the capacitor structure and the first via conductor.

In yet another exemplary aspect, a method for manufacturing a capacitor die is provided. The method includes the following operations. A capacitor wafer is received. The capacitor wafer has a capacitor structure and a conductive line surrounding the capacitor structure. The capacitor structure includes a lower electrode and an upper electrode, and wherein the conductive line is leveled with the lower electrode and electrically isolated from the lower electrode. A first via conductor is formed on the conductive line and laterally surrounds the capacitor structure.

The foregoing outlines structures of several embodiments so that those skilled in the art may better understand aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A capacitor device, comprising:
a capacitor structure, comprising a lower electrode and an upper electrode;
a conductive line leveled with the lower electrode and electrically isolated from the lower electrode;
an interlayer dielectric (ILD) disposed over the capacitor structure and the conductive line;
a first via conductor adjacent to the capacitor structure and electrically coupled on an upper surface of the conductive line;
a third via conductor disposed over the upper electrode of the capacitor structure and electrically coupled to the capacitor structure; and
a top metal layer disposed over the first via conductor and the third via conductor, the top metal layer comprising:
a first metal line electrically connected to the first via conductor; and
a second metal line electrically connected to the third via conductor,
wherein a top surface of the first metal line is entirely covered by the ILD, and a top surface of the second metal line is free from being entirely covered by the ILD.

2. The capacitor device of claim 1, wherein the conductive line in combination with the first via conductor are disposed on a peripheral area surrounding the capacitor structure, and are electrically isolated from the capacitor structure.

3. The capacitor device of claim 1, further comprising a second via conductor adjacent to the capacitor structure and electrically coupled to the lower electrode, wherein the conductive line in combination with the first via conductor surround the capacitor structure and the second via conductor.

4. The capacitor device of claim 3,
wherein the conductive line in combination with the first via conductor further surround the third via conductor.

5. The capacitor device of claim 4, wherein, from a top view, the third via conductor comprises a plurality of third via conductors forming an array of discrete patterns, and the first via conductor surrounds the array of discrete patterns.

6. The capacitor device of claim 4, wherein an upper surface of the first via conductor is at least leveled with one of an upper surface of the second via conductor and an upper surface of the third via conductor.

7. The capacitor device of claim 4, further comprising a first metal layer disposed over the capacitor structure, under the top metal layer, and embedded in the ILD, the first metal layer comprising:

a third metal line connected to the first via conductor;

a fourth metal line connected to the second via conductor; and a fifth metal line connected to the third via conductor.

8. The capacitor device of claim 7, wherein the first-third metal line is substantially leveled with the fourth and the fifth metal lines.

9. The capacitor device of claim 7, wherein the top metal layer further comprising:

a sixth metal line connected to the fourth metal line.

10. The capacitor device of claim 9, further comprising a first conductive terminal and a second conductive terminal disposed on the second and sixth metal lines, respectively.

11. The capacitor device of claim 9, wherein the ILD further comprises a fourth via conductor coupled between the first metal line and the third metal line, a fifth via conductor coupled between the second metal line and the fifth metal line, and a six via conductor coupled between the fourth metal line and the sixth metal line.

12. The capacitor device of claim 1, wherein the first via conductor comprises tungsten, wherein the lower electrode and the upper electrode comprises titanium.

13. An integrated capacitor device, comprising:

a capacitor structure, comprising a lower electrode and an upper electrode;

an interlayer dielectric (ILD) disposed over the capacitor structure;

a first via conductor electrically connected to the lower electrode, and electrically connected to a first metal line over the first via conductor; and a second via conductor adjacent to the first via conductor and electrically isolated from the first via conductor, wherein the second via conductor is configured to be a seal ring structure to encircle the capacitor structure and the first via conductor, the second via conductor is electrically connected to a second metal line over the second via conductor, the second metal line and the first metal line are located in the same metal layer, wherein a top surface of the second metal line is entirely covered by the ILD, and a top surface of the first metal line is free from being entirely covered by the ILD.

14. The integrated capacitor device of claim 13, wherein an upper surface of the second via conductor is leveled with an upper surface of the first via conductor, and a lower surface of the second via conductor is leveled with a lower surface of the first via conductor.

15. The integrated capacitor device of claim 14, wherein, from a top view, the upper surface of the second via conductor form a continuous pattern, and the upper surface of the first via conductor form a plurality of discrete patterns.

16. The integrated capacitor device of claim 13, wherein, from a top view, the second via conductor comprises two adjacent conductive seal rings to encircle the capacitor structure and the first via conductor.

17. A method for manufacturing an integrated capacitor device, the method comprising:

receiving a capacitor wafer having a capacitor structure and a conductive line surrounding the capacitor structure, wherein the capacitor structure comprises a lower electrode and an upper electrode, and wherein the conductive line is leveled with the lower electrode and electrically isolated from the lower electrode;

forming a first via conductor on the conductive line and laterally surrounding the capacitor structure;

forming a third via conductor on the upper electrode of the capacitor structure;

forming a metal layer over the first via conductor and the third via conductor to form a first metal line over the first via conductor and a second metal line over the third via conductor;

forming a passivation layer over the metal layer; and forming an opening over the second metal line to expose the second metal line from the passivation layer, and the first metal line is entirely covered by the passivation layer.

18. The method of claim 17, wherein forming the first via conductor comprises forming a continuous trench in an interlayer dielectric (ILD) embedding the capacitor structure, and filling a first conductive material into the continuous trench.

19. The method of claim 18, further comprising:

forming a second via conductor on the lower electrode, wherein forming the second via conductor comprises forming a plurality of discrete recesses in the ILD, and filling a second conductive material into the discrete recesses.

20. The method of claim 19, wherein forming the continuous trench and forming the plurality of discrete recesses are performed in a single operation.

* * * * *